, 2012

United States Patent
Gupta et al.

(10) Patent No.: US 8,135,666 B2
(45) Date of Patent: Mar. 13

(54) SYSTEMS AND METHODS FOR POLICY BASED EXECUTION OF TIME CRITICAL DATA WAREHOUSE TRIGGERS

(75) Inventors: Rajeev Gupta, Noida (IN); Mukesh K. Mohania, Agra (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 12/722,253

(22) Filed: Mar. 11, 2010

(65) Prior Publication Data

US 2011/0225116 A1   Sep. 15, 2011

(51) Int. Cl.
*G06F 17/00* (2006.01)
(52) U.S. Cl. ........ 707/602; 707/600; 707/610; 707/661; 706/45; 706/62
(58) Field of Classification Search ........................ None
See application file for complete search history.

(56) References Cited

U.S. PATENT DOCUMENTS

| | | | |
|---|---|---|---|
| 5,781,911 A * | 7/1998 | Young et al. ................. | 707/600 |
| 7,412,481 B2 | 8/2008 | Nicholls et al. | |
| 7,627,597 B2 * | 12/2009 | Dettinger et al. ..................... | 1/1 |
| 7,756,827 B1 * | 7/2010 | Yung et al. ..................... | 707/634 |
| 7,941,397 B2 * | 5/2011 | Wilms et al. .................... | 707/602 |
| 2002/0107719 A1 * | 8/2002 | Tsang et al. ..................... | 705/10 |
| 2004/0148278 A1 * | 7/2004 | Milo et al. ........................ | 707/3 |
| 2004/0167789 A1 * | 8/2004 | Roberts et al. ..................... | 705/1 |
| 2004/0181509 A1 * | 9/2004 | Dettinger et al. ................. | 707/2 |
| 2005/0015377 A1 * | 1/2005 | Wan ................................ | 707/10 |
| 2005/0187991 A1 * | 8/2005 | Wilms et al. .................... | 707/204 |
| 2006/0136354 A1 * | 6/2006 | Bell et al. .......................... | 707/1 |
| 2006/0229887 A1 * | 10/2006 | Liang et al. ....................... | 705/1 |
| 2007/0094261 A1 * | 4/2007 | Phelan et al. ..................... | 707/9 |
| 2007/0226175 A1 * | 9/2007 | Resnic et al. ..................... | 707/1 |
| 2008/0027896 A1 | 1/2008 | Anjur | |
| 2009/0182779 A1 * | 7/2009 | Johnson ........................ | 707/200 |
| 2010/0198778 A1 * | 8/2010 | Venugopal et al. ........... | 707/602 |
| 2010/0280991 A1 * | 11/2010 | Chen et al. ..................... | 707/602 |
| 2011/0040727 A1 * | 2/2011 | Golab et al. .................. | 707/618 |

* cited by examiner

*Primary Examiner* — Hung Le
(74) *Attorney, Agent, or Firm* — Ference & Associates LLC

(57) ABSTRACT

Embodiments of the invention broadly contemplate systems, methods, apparatuses and program products that employ a policy based method of timely execution of triggers over a data warehouse. Embodiments of the invention utilize methods to convert a trigger condition into differential queries over data sources, to decide when to send queries to data sources, and determine to which data sources to send queries.

20 Claims, 4 Drawing Sheets

SYSTEMS AND METHODS FOR POLICY BASED EXECUTION OF TIME CRITICAL DATA WAREHOUSE TRIGGERS

BACKGROUND

The subject matter described herein generally relates to systems and methods for efficiently updating and analyzing the contents of a data warehouse.

A data warehouse (DW) can be thought of as a repository of data that has been extracted from one or more data sources. The data may be derived and integrated from heterogeneous and autonomous distributed data sources, using for example an extract, transform and load process (ETL). In an ETL process, generally for each data source, a source-specific data extractor retrieves the data. This data is converted into a uniform relational (warehouse) format. The data is then loaded into the DW.

To update a DW, several conventional techniques have been utilized. A DW may be updated periodically, wherein the data updates are kept at data sources and sent to the DW on a periodic basis according to some predefined period. Alternatively, DW updates may be done on-demand. That is, on-demand updates occur whenever an update request is sent from a DW administrator. Finally, "real time" updates for a DW have been implemented wherein each data source update is propagated to the DW as soon as it happens.

Analysis of the data stored in a DW often begins by using querying techniques to identify desired data that satisfies one or more conditions. For example, a DW may run an application for complex aggregation queries. Many of these queries are used to execute contingent events in the form of triggers, where some predefined action is performed when a trigger condition is satisfied on the DW. As an example, in a DW having sales data from various departmental stores, a trigger query may include a notification of when total sales in stores located in a particular geographic region exceeds 10,000 units.

To evaluate a trigger condition, the DW has to evaluate the query (for example, "retrieve total sales in the particular geographic region this week") with each data update. This may be costly and/or inconsistent. If data updates are sent to the DW periodically with a short period/interval, the query will get executed very frequently and this may be costly in terms of computing resources. At an extreme end, if data updates are sent to a DW in real time, the trigger query will get executed very frequently. On the other hand, if the period has a long interval, the query will not get executed frequently enough and updates will not be had in a timely fashion.

Triggers defined over a DW need to be evaluated frequently to know whether triggers need to be tripped without unnecessarily wasting resources. However, determining an effective and efficient implementation of triggers has proven difficult.

BRIEF SUMMARY

Embodiments of the invention broadly contemplate systems, methods, apparatuses and program products that employ a policy based method of timely execution of triggers over a data warehouse (DW). Embodiments of the invention utilize methods to convert a trigger condition into differential queries over data sources, to decide when to send queries to data sources, and to determine to which data sources to send queries.

In summary, one aspect of the invention provides an apparatus comprising: one or more processors; and a computer readable storage medium having computer readable program code embodied therewith and executable by the one or more processors, the computer readable program code comprising: computer readable program code configured to send one or more queries to a data warehouse; computer readable program code configured to evaluate a trigger condition; computer readable program code configured to, responsive to a determination that the trigger condition is not satisfied by a query result obtained from the one or more queries sent to the data warehouse, send one or more differential queries to one or more remote data sources; and computer readable program code configured to determine an aggregate query result, the aggregate query result comprising an aggregation of the query result obtained from the one or more queries sent to the data warehouse and one or more query results obtained from the one or more differential queries.

Another aspect of the invention provides a method comprising: sending one or more queries to a data warehouse; evaluating a trigger condition; responsive to determining that the trigger condition is not satisfied by a query result obtained from the one or more queries sent to the data warehouse, sending one or more differential queries to one or more remote data sources; and determining an aggregate query result, the aggregate query result comprising an aggregation of the query result obtained from the one or more queries sent to the data warehouse and one or more query results obtained from the one or more differential queries.

A further aspect of the invention provides a computer program product comprising: a computer readable storage medium having computer readable program code embodied therewith, the computer readable program code comprising: computer readable program code configured to send one or more queries to a data warehouse; computer readable program code configured to evaluate a trigger condition; computer readable program code configured to, responsive to a determination that the trigger condition is not satisfied by a query result obtained from the one or more queries sent to the data warehouse, send one or more differential queries to one or more remote data sources; and computer readable program code configured to determine an aggregate query result, the aggregate query result comprising an aggregation of the query result obtained from the one or more queries sent to the data warehouse and one or more query results obtained from the one or more differential queries.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
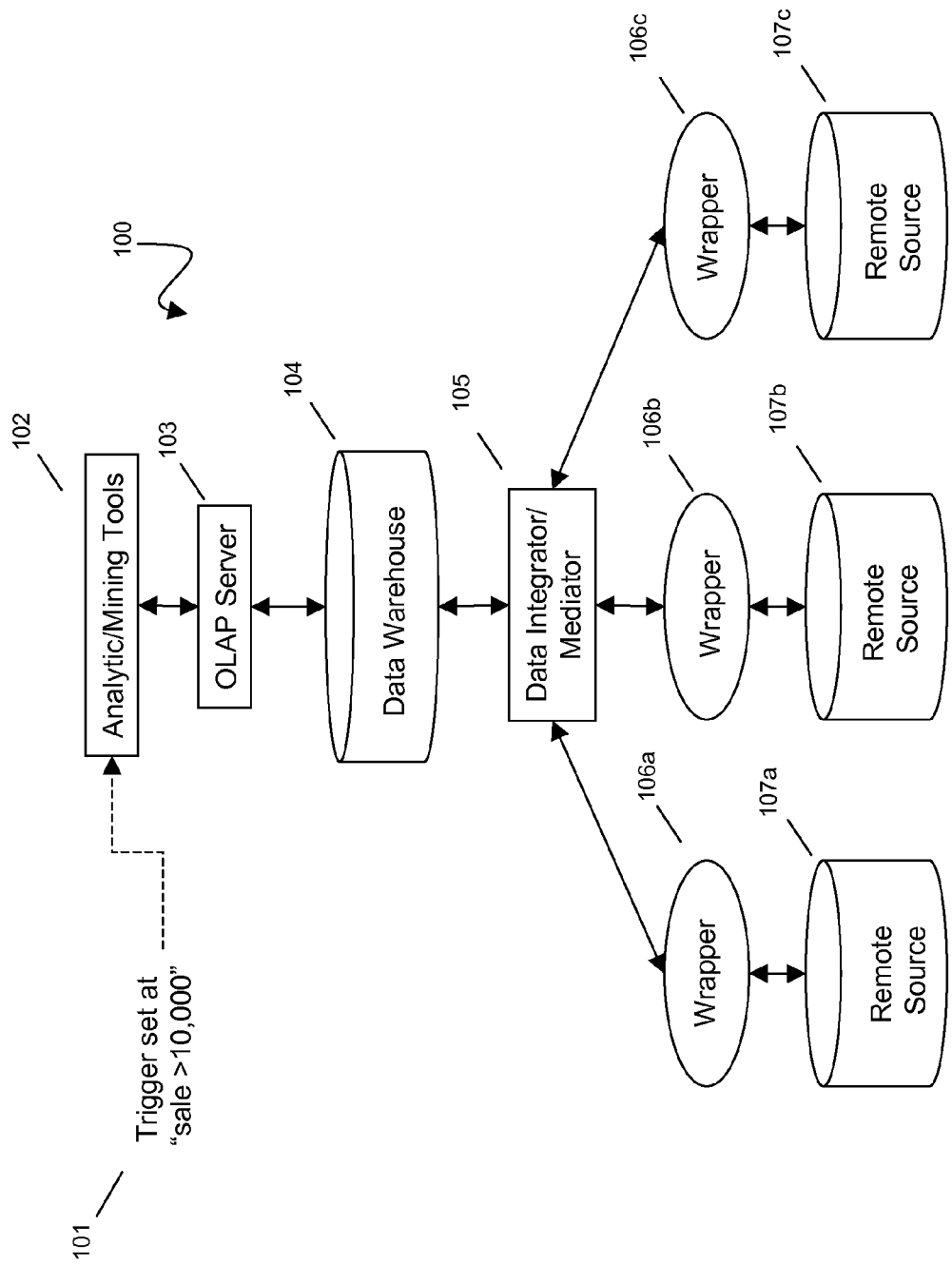
FIG. 1 illustrates an overview of a data warehousing system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The inventors have recognized that for the best consistency, data warehouse (DW) queries should be executed at least in part at the data sources. However, a whole query often can not be answered at the data sources, as the data sources may not have data which is required for complete query execution (for example, older, historical data). Moreover, it is costly to execute queries at data sources, as data source schema may not be suitable for the DW queries. Thus, it is important to achieve a balance between executing a DW query at the DW, with fewer resources expended and very frequently updating the DW from the remote data sources, ensuring timeliness of query results.

Embodiments of the invention are configured to execute a DW query scheme including differential queries; that is, a query is executed jointly at a DW and at distributed data source(s) to ensure timeliness of performance with increased efficiency. Depending on the results of different sub queries at the distributed data sources, the result of the trigger condition can be obtained at the DW in an efficient manner.

Accordingly, embodiments of the invention are configured to get data from one or more data sources to the DW periodically with a sufficiently large period. A policy may be defined to decide on the next update period. The frequency of the update can be modified, based for example on data dynamics. The trigger query is executed with each periodic update. If the trigger condition is close to (as defined by policy) being true, differential queries to the data sources are used. Thus, a union of the local result (at the DW) and the differential result(s) (from the data source(s)) gives the overall query result.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts an exemplary conventional data warehousing system 100. As shown, a trigger condition is set. In this example consider the trigger condition to be met when the sale of a particular item in a given geographic region exceeds 10,000 units in a given time period. The trigger 101 is input into an analytical tool 102, which is in operative communication with a server 103. The server 103, in this example an online analytical processing (OLAP) server, issues queries to the DW 104. The DW 104 needs to obtain the data necessary for an appropriate query answer.

Therefore, the DW 104 will employ some updating scheme in order to obtain the relevant sales information from the appropriate remote sources originating the data, for example the sales data. As described herein, this may take a variety of forms. For example, the DW 104 may receive updates from a data integrator/mediator 105 at regular intervals. The data integrator/mediator 105 in turn polls the remote data sources 107a-c via wrappers 106a-c, respectively, in order to obtain the data updates and convert them into a usable format stored in the DW 104. The remote sources 106a-c may be, for example, data sources located at the particular stores in the given geographic region.

Figure 2:
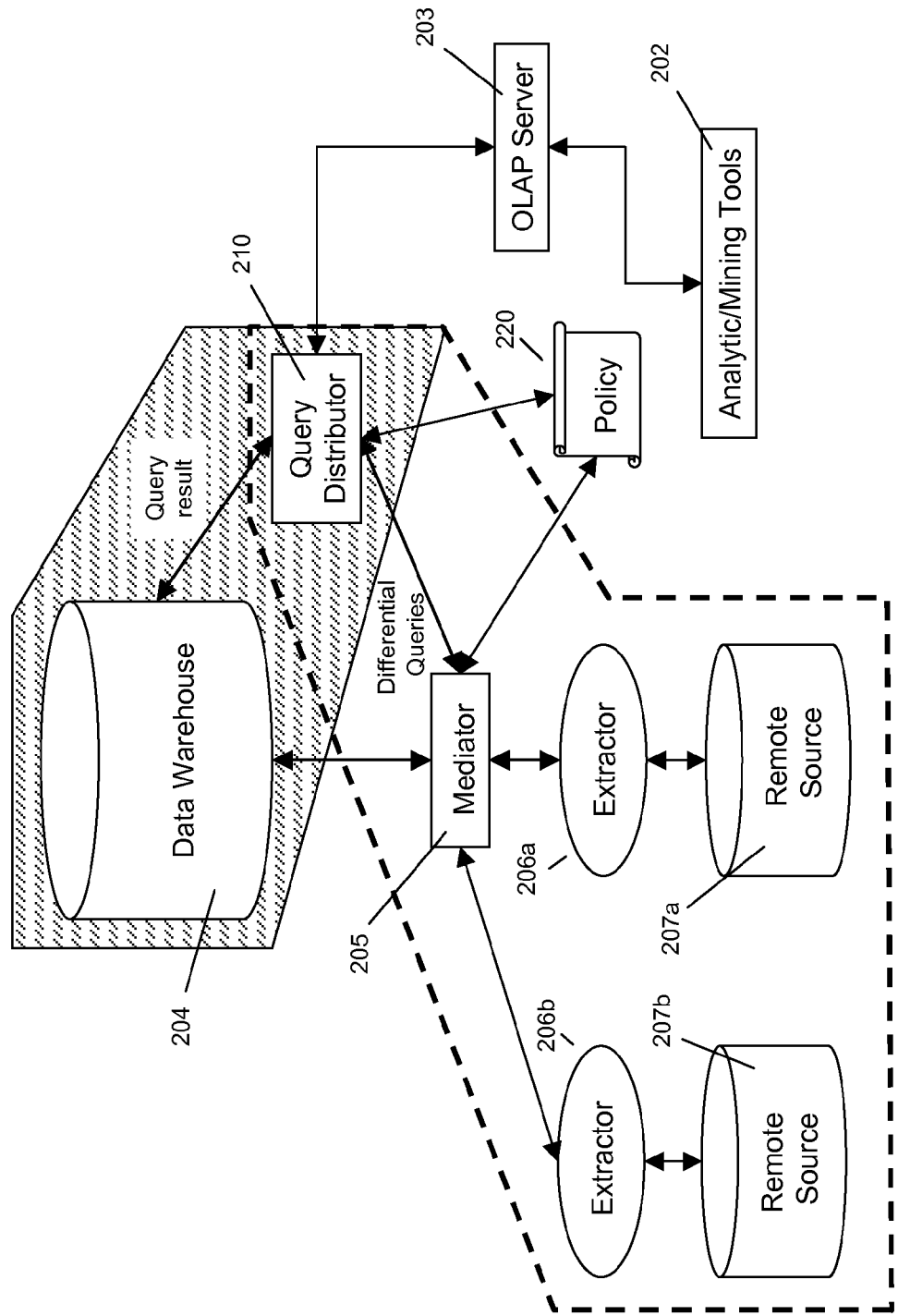
FIG. 2 illustrates an overview of a data warehousing system configured for differential querying.

Referring to FIG. 2, a high-level example of a differential query scheme is illustrated according to an embodiment of the invention. Again, embodiments of the invention are configured to get data from one or more remote data sources 207a-b to the DW 204 periodically, with a sufficiently large period. In this regard, a mediator 205 gathers data from the remote sources 207a-b at the period, as extracted by extractors 206a-b. A policy 220 can be defined to decide on the next update period. The frequency of the update may be modified, based for example on data dynamics. The trigger condition is checked with each periodic update of the DW 204. Accordingly, a query distributor 210 accepts input queries from a data mining tool 202 (for example, issued via an OLAP server 203) and queries the DW 204 locally with each periodic update.

If the trigger condition is close to being true (as defined by policy), but not yet true, DW 204 may not yet contain data already existing at the remote sources 207a-b needed to make the trigger condition true. That is, the DW may be in-between periodic updates, where the next update makes the trigger condition true. As continuous (real-time) updates are expensive, and longer periodic updates are too slow, embodiments of the invention employ a threshold value (as for example set per policy 220) for issuing differential queries to the data source(s). The threshold value is set such that the trigger condition is close to being true. If so, embodiments of the invention are configured to issue differential queries to the remote data sources 207a-b. A union of the local result (at the DW 204) and the differential result(s) (from the remote data sources 207a-b) gives the overall query result, which can be used to determine if the trigger condition is met.

Figure 3:
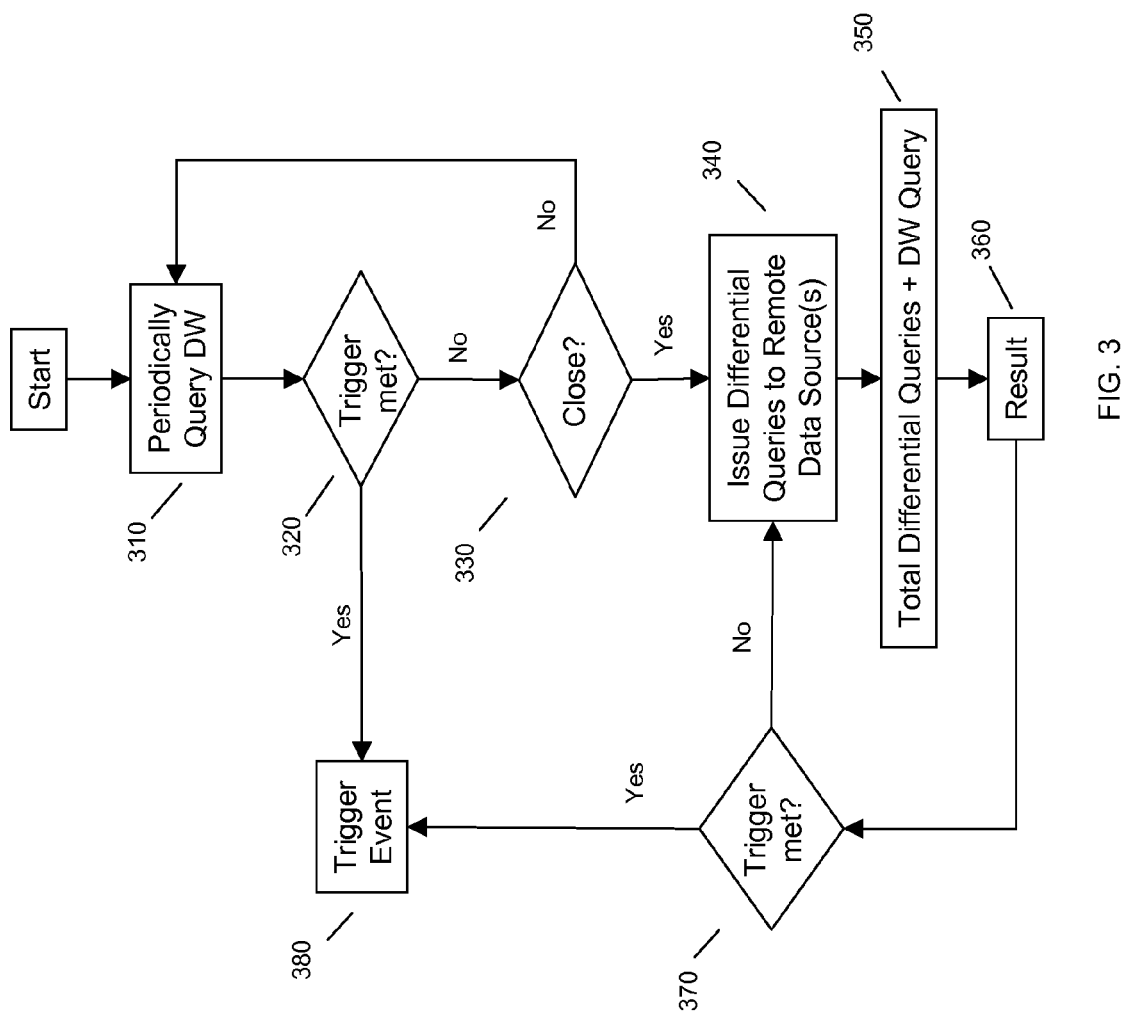
FIG. 3 illustrates an exemplary method for differential querying.

Turning to FIG. 3, a high level flow of differential querying is illustrated. As shown, the process starts with local, periodic querying of the DW 310. It is determined at 320 if the trigger condition is met, and if so, the trigger event is executed at 380. However, if the trigger condition is not met, it is determined if the trigger condition is close to being true, as per a predefined threshold, at 330. If the trigger condition is close to being true, as per the predefined threshold defining closeness for the given context, one or more differential queries are issued to remote data source(s) in order to quickly check for updates that may meet the trigger condition (make the trigger condition true) at 340. Otherwise, the periodic querying of the DW continues.

Once differential queries are issued to the remote data source(s), those data updates are taken into consideration with the local (DW) query, and the union of these is determined at 350. The union of the local and the differential queries determines an up-to-date query result at 360. It is next determined if the result at 360 exceeds the trigger condition at 370. If so, the event contingent on the trigger is executed at 380. Otherwise, the process may cycle back to issue one or more differential queries.

As a non-limiting example using sales data, consider the trigger (which may be formed as an SQL query, as described further herein) "notify when sales of product X>10,000 units for stores in State A". A policy is set by an administrator to periodically update the DW with sales data from remote sources (stores in State A), for example on a daily basis. First consider the condition where the current value of sales of product X is 2000, and an average of 1000 sales per day in State A have been recorded. At this point, there is no need to expend computing resources issuing differential queries, as it is unlikely that the sales of product X in State A will exceed 10,000 units prior to the next periodic update of the DW.

However, assume instead that the current value of sales of product X is 9000. In such a case, it is likely that the trigger condition will be satisfied (true) shortly, that is prior to the next periodic update. Thus, embodiments of the invention are configured to determine this "closeness" by implementing a policy (for example, when trigger value−current value>threshold value, issue differential queries). Thus, differential queries are sent by a mediator, for example the differential queries can be executed on recovery logs of the remote data sources to avoid executing them on committed data frequently. The results of these differential queries may be added to the local (DW) query result prior to the next periodic update, potentially allowing earlier satisfaction of the trigger condition. Moreover, computationally expensive solutions such as real time updates of the DW are unnecessary.

Embodiments of the invention employ a policy for determining the nature and timing of the differential queries. The policy employed is customizable. For example, if one or a few remote data sources are determined to be dominating the recent updates of the DW, differential queries may be sent to these few remote data sources. The differential queries can be issued according to a query template dictating as much, with one or more sub queries (to one or more remote sources) being issued intelligently based on, among other things, the update history. Thus, a mediator according to an embodiment of the invention, is configured to determine, based on the policy implemented, the nature and timing of the differential queries.

A trigger condition may for example include an SQL statement over a DW schema which returns a numeric value, N; a threshold over the result of the SQL query, T; and a relational operator ($<, >, =, \leq, \geq$) connecting N and T. An example of an SQL query statement is "select sum (amount) from sales where sale_date>now( )-interval '24 hours'". Example policy languages include but are not limited to ECA rules, if-then-else, and ACPL.

For each trigger condition, embodiments of the invention maintain the value of N after each periodic update of the DW. These values are used to know the periodic update before which the trigger condition is likely satisfied ("closeness"). For example, if the value of N in a given SQL query with each successive update is 100, 300, 475, 705, 910 . . . , and the threshold T is 1000, then embodiments of the invention use these N values to predict that the trigger condition is likely true in the $6^{th}$ (sixth) period. The differential queries may then be sent from the DW to the mediator along with the policy, which the mediator can use to get data from the data sources. These statistics (N values) are maintained by embodiments of the invention for each source to decide on the differential query to be sent to the given sources. The same or similar statistics may be used by the mediator to decide whether to send a query to a given data source. For example, if most of the updates for a trigger condition to be true are obtained from a given set of data sources, the mediator need not send the differential queries to other data sources.

A policy may also be set for deciding when to send differential queries to the mediator for processing. The differential query can be sent to the mediator based on some specific event or a temporal condition, for example. Thus, a user may set a specific trigger condition to be: SQLstatement>T. This policy can be hard coded by the user as: if N>T', send query SQLstatement>T−T' to mediator along with a period. The mediator, for its part, gets data from the sources (using SQLstatement) and sends it to the DW if the condition becomes true. The mediator may use a specified period to get data periodically from data sources and evaluate the condition. Otherwise, the value of T' is estimated using statistics maintained, as described herein. The DW may use a condition estimator, which estimates the time when the condition is met. This aids in knowing when to send a differential query to the mediator. The ultimate result of the query (and differential query) could be used solely to obtain an answer rather than also updating the DW.

As described herein, the mediator may employ a policy to decide the query for individual data sources. In this regard, the mediator is configured to convert the DW query into a query for individual data sources using schema mapping. In this context, the mediator can obtain the results of the individual queries, aggregate them, and return the results to the DW if the differential query is satisfied. Embodiments of the invention also allow a user to customize a number and type of differential query, for example by manually changing the policy.

It will be readily understood that embodiments of the invention can be implemented using any of a wide variety of computing systems. In this regard, a non-limiting and exemplary computing device is described below.

Figure 4:
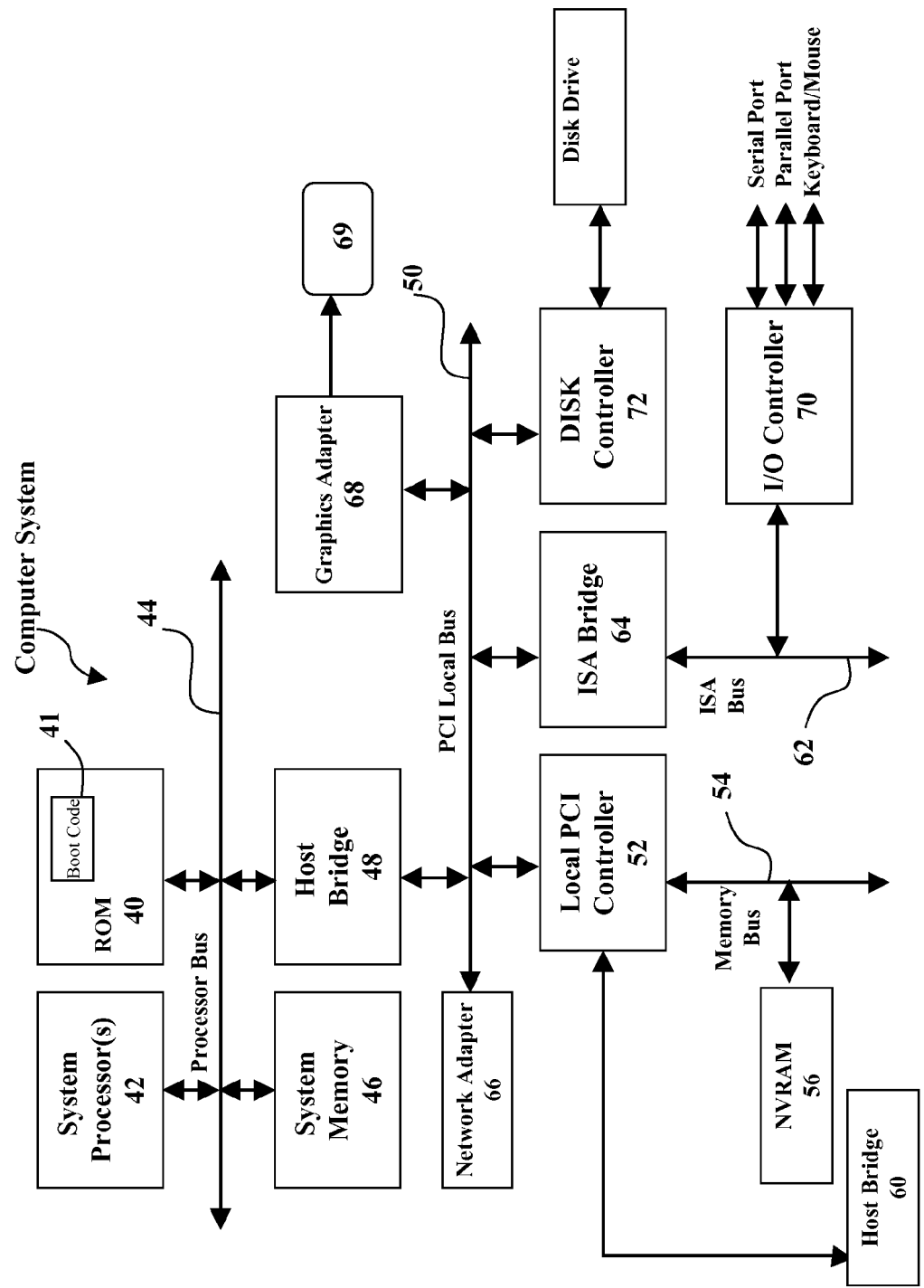
FIG. 4 illustrates an exemplary computer system.

Referring now to FIG. 4, there is depicted a block diagram of an illustrative embodiment of a computer system. The illustrative embodiment depicted in FIG. 4 may be any of a wide variety of electronic devices such as a work station personal computer, a server or the like. As is apparent from the description, however, aspects of the invention may be implemented in any appropriately configured device.

As shown in FIG. 4, computer system includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system further includes Industry Standard Architecture (ISA) bus 62, which is coupled to PCI local bus 50 by ISA bridge 64. Coupled to ISA bus 62 is an input/output (I/O) controller 70, which controls communication between computer system and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to send at least one query to a data warehouse;
   computer readable program code configured to evaluate a trigger condition;
   computer readable program code configured to, responsive to a determination that the trigger condition is not satisfied by a query result obtained from the at least one query sent to the data warehouse and the trigger condition is close to being true, send at least one differential query to at least one remote data source; and
   computer readable program code configured to determine an aggregate query result, the aggregate query result comprising an aggregation of the query result obtained from the at least one query sent to the data warehouse and at least one query result obtained from the at least one differential query.

2. The apparatus according to claim 1, further comprising computer readable program code configured to execute the trigger condition responsive to a determination that the aggregate query result exceeds a predetermined threshold.

3. The apparatus according to claim 1, wherein the computer readable program code configured to send the at least one query to the data warehouse is further configured to send periodic queries to the data warehouse.

4. The apparatus according to claim 3, further comprising computer readable program code configured to determine if an aggregate result of the periodic queries is within a predetermined threshold of the trigger condition;
   wherein if the aggregate result of the periodic queries is within the predetermined threshold of the trigger condition, the at least one differential query is sent to the at least one remote data source.

5. The apparatus according to claim 4, wherein the predetermined threshold is selected such that the trigger condition will be satisfied prior to a next periodic query of the data warehouse.

6. The apparatus according to claim 1, further comprising computer readable program code configured to employ at least one query template to define the at least one differential query.

7. The apparatus according to claim 1, further comprising computer readable program code configured to implement a policy for sending the at least one differential query to the at least one remote data source.

8. The apparatus according to claim 7, wherein the policy determines a timing of the at least one differential query.

9. The apparatus according to claim 7, wherein the policy determines which of the at least one remote data sources is to be sent the at least one differential query.

10. A method comprising:
    sending at least one query to a data warehouse;
    evaluating a trigger condition;
    responsive to determining that the trigger condition is not satisfied by a query result obtained from the at least one query sent to the data warehouse and the trigger condition is close to being true, sending at least one differential query to at least one remote data source; and
    determining an aggregate query result, the aggregate query result comprising an aggregation of the query result obtained from the at least one query sent to the data warehouse and at least one query result obtained from the at least one differential query.

11. The method according to claim 10, further comprising executing the trigger condition responsive to determining that the aggregate query result exceeds a predetermined threshold.

12. The method according to claim 10, wherein sending the at least one query to the data warehouse further comprises sending periodic queries to the data warehouse.

13. The method according to claim 12, further comprising determining if an aggregate result of the periodic queries is within a predetermined threshold of the trigger condition;
    wherein if the aggregate result of the periodic queries is within the predetermined threshold of the trigger condition, the at least one differential query is sent to the at least one remote data source.

14. The method according to claim 13, wherein the predetermined threshold is selected such that the trigger condition will be satisfied prior to a next periodic query of the data warehouse.

15. The method according to claim 10, further comprising employing at least one query template to define the at least one differential query.

16. The method according to claim 10, further comprising implementing a policy for sending the at least one differential query to the at least one remote data source.

17. The method according to claim 16, wherein the policy determines a timing of the at least one differential query.

18. The method according to claim 16, wherein the policy determines which of the at least one remote data source is to be sent the at least one differential query.

19. The method according to claim 16, wherein the policy comprises a predetermined threshold, and further wherein, responsive the query result obtained from the at least one query sent to the data warehouse exceeding the predetermined threshold, the at least one differential issued.

20. A computer program product comprising:
    a non-transitory computer readable storage medium having computer readable program code embodied therewith, the computer readable program code comprising:
    computer readable program code configured to send at least one query to a data warehouse;
    computer readable program code configured to evaluate a trigger condition;
    computer readable program code configured to, responsive to a determination that the trigger condition is not satisfied by a query result obtained from the at least one query sent to the data warehouse and the trigger condition is close to being true, send at least one differential query to at least one remote data source; and
    computer readable program code configured to determine an aggregate query result, the aggregate query result comprising an aggregation of the query result obtained from the at least one query sent to the data warehouse and at least one query result obtained from the at least one differential query.

* * * * *